United States Patent [19]

Ruhl

[11] Patent Number: 5,593,114
[45] Date of Patent: Jan. 14, 1997

[54] SYNTHETIC VISION AUTOMATIC LANDING SYSTEM

[75] Inventor: Louis F. Ruhl, Santa Ana, Calif.

[73] Assignee: McDonnell Douglas Corporation, Huntington Beach, Calif.

[21] Appl. No.: 229,655

[22] Filed: Apr. 19, 1994

[51] Int. Cl.⁶ ................................................ B64D 45/04
[52] U.S. Cl. .................................................... 244/183
[58] Field of Search ................................ 244/76 R, 1 R, 244/183, 185, 186, 187, 188, 194, 195; 304/407.1; 342/176

[56] References Cited

U.S. PATENT DOCUMENTS

| H628 | 4/1989 | McIngvale . | |
|---|---|---|---|
| 3,076,961 | 2/1963 | Bibbero | 304/407.1 |
| 4,029,271 | 6/1977 | Murphy | 244/186 |
| 4,040,005 | 8/1977 | Melvin | 244/185 |
| 4,104,612 | 8/1978 | Lowe . | |
| 4,368,517 | 1/1983 | Lovering | 244/185 |
| 4,454,496 | 6/1984 | Lowe . | |
| 4,758,839 | 7/1988 | Goebel | 13/8 |
| 4,825,194 | 4/1989 | Rasinski | 244/185 |
| 5,369,589 | 11/1994 | Steiner | 342/176 |

*Primary Examiner*—Galen Barefoot
*Attorney, Agent, or Firm*—Henry G. Kohlmann

[57] ABSTRACT

A system is provided which permits a display of ground conditions to the pilot through the use of a forward looking sensor set and uses signals generated from the aircraft to simulate ground aid signals which are used for automatic landing of the aircraft. General flight path angle and course aim point corrections are made from the cockpit of the aircraft and are adjustable as the flight progresses. Most of the systems today that have fixed path capability to ground intercepts are based on ground installed equipment. This system can establish the inertial flight path track internally to the aircraft and provides an automatic landing system which allows the pilot to concentrate on the visibility of the forward scene to confirm the safe progress of the landing.

24 Claims, 9 Drawing Sheets

SYNTHETIC VISION AUTOMATIC LANDING SYSTEM

BACKGROUND OF THE INVENTION

1. Field of the Invention

This invention relates to the field of automatic landings by aircraft in low visibility conditions. More specifically this invention relates to systems which provide the pilot with visual cues which represent a runway and automatic landing systems which permit guidance and automatic landing by aircraft in low visibility conditions when there is little or no ground aid signals available.

2. Description of the Prior Art

The ILS systems in use today evolved from the early use of radio frequency beams installed at the airport to provide beam guidance for aircraft to a runway. The beam consists of radio frequencies which emanate from ground based antennas with the radiated fields overlapping so that with equal strength of each of the radiated fields an approximate straight line is established. A localizer and glideslope set of antennas (on-board the aircraft) are required.

This system comprises the Instrument Landing Systems (ILS) that have been installed at airports throughout the world. The desire to fly in all types of weather has led to the growth and development of equipment installed at the airport and on the aircraft which will allow the aircraft to land in various weather levels. Such weather levels are defined as Category I, II, and III. Category I is 2400 or greater feet Runway Visual Range (RVR), Category II is 1200 to 2400 feet RVR and Category III which is subdivided into three levels of IIIa at 1200 to 700 feet RVR, IIIb at 700 to 150 feet RVR and IIIc at 150 to 0 feet RVR.

The implementation of the categorized weather conditions has led to automatic landing systems being used as the primary method of landing an aircraft in all category III weather conditions.

The problems experienced with the ILS as affected by ground structures such as hangar doors, and creation of variability in the beam by the opening and closing of hangar doors, existing buildings being installed or removed in the vicinity of the antenna and even including aircraft taxiing near or flying over the antenna. These beam distortions can be tolerated in some cases and cannot in others. In fact some of the times the beams are shut down in snow and ice conditions. These problems have been severe enough that the FAA has developed a new system over the last 20 years called Microwave Landing System (MLS) that is to replace the ILS. The MLS system is intended to also provide ground based signals for category I, II, and III landing systems for use during inclement weather.

The airlines recognize that some of the limitations of the ILS would be overcome by the MLS system which also sends out sector data information which is more useful to an aircraft than straight line information of the ILS. However, they have questioned the long term economics of this system, due to the expensive on-board equipment required for implementation of the MLS system and the need to replace all of the existing ILS (which are currently being replaced very slowly). Currently there are about 35 airports in the United States that are equipped with the category 3 ILS beams. The FAA has been reluctant to install additional ILS systems in view of the benefits of the MLS and airlines are reluctant to endorse the MLS because of the expense of the airborne equipment and continued dependence on the FAA.

In order to solve the problems of limited number of installations of the ground based category III ILS systems and the rate at which the FAA is installing replacement MLS systems, and also to obtain greater autonomy with the use of the aircraft, it is desirable to have a system which provides a real time sense of the airport for approach and landing on-board the aircraft.

The instant invention does provide such a system, which permits all category III weather landings, does not require ground based signals, does not require receiving antennae, and does not require expensive ground based equipment installation.

BRIEF DESCRIPTION OF THE INVENTION

The instant invention is an Enhanced or Synthetic Vision (also called Autonomous) Landing System (E/SV). This system allows the pilot to view the approach scene with the use of a forward looking radar or equivalent sensor which provides the means of identifying the runways and the airport and land the aircraft using the automatic landing systems on virtually all types of aircraft. A pilot effectively turns the flight task during zero visibility or other low visibility weather conditions into a synthetic "see to land" approach because the image from the forward looking sensor provides sufficient detail to turn any instrument landing into what appears to be a visual landing.

The E/SV system, when installed in an aircraft, will allow any aircraft to operate under visual rules in bad weather as defined by categories I, II, or III. The level of reliability and availability in the system determines the level of weather in which it could be used. The E/SV system provides the pilot with the ability to land with little or no ground aids. Virtually all current aircraft that are being purchased by the airlines are equipped with an ILS Category IIIb capability or those which permit visibility down to approximately 150 to 300 feet RVR.

The E/SV system, has more capability in all weather landing, than the existing ILS systems and provides a forward scene which is similar to the real visual conditions. It is a major advantage to the pilot to be able to establish the flight path to the landing using the synthetic visual cues and accomplish an automatic landing by manipulation of controls in the cockpit even when no automatic landing ILS or MLS signals are available from the ground. A significant reduction in the pilots flying workload would result during a period of high stress and activity such as when landing in poor weather conditions. In addition, the primary task of the pilot in interpreting and using the visual scene for the safe continuance of the landing, can be significantly improved.

The advantage of the E/SV System is that it is usable without the necessary ILS ground installations and can give any airport a Category III capability. The advantage that the automated E/SV system has over the piloted system is that it allows the pilot to monitor the weather and other conditions as well as allowing him to be more aware of the aircraft situation in the limited visibility environment in which he is flying. The E/SV system allows the pilot to be more alert for unforeseen obstacles that may exist near or on the airport or runway and allows the pilot to be the monitor for the safe progress and completion of the landing and rollout.

DETAILED DESCRIPTION OF THE INVENTION

Figure 1:
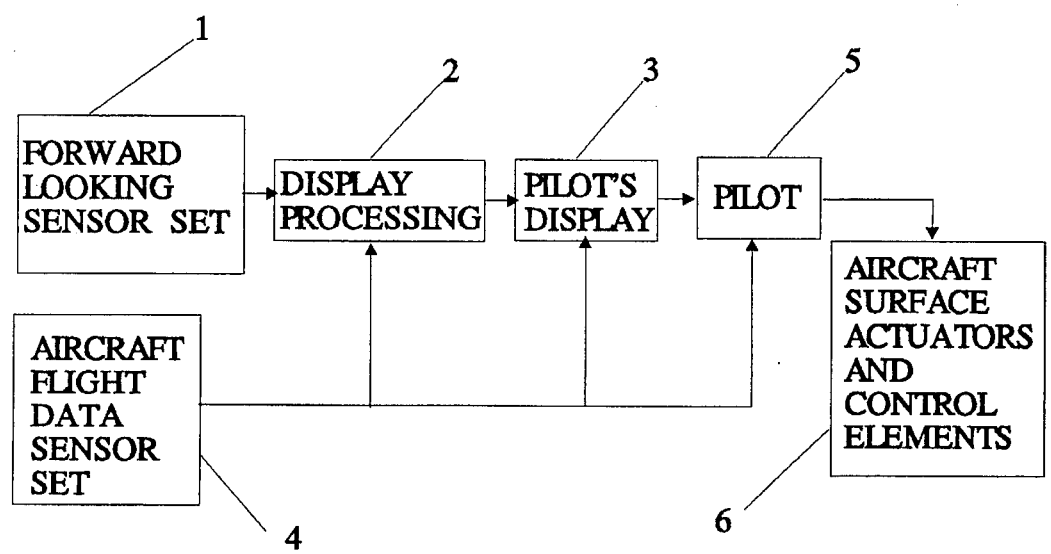
FIG. 1 is a block diagram of the Enhanced/Synthetic Vision system without automatic landing.

A generic Enhanced/Synthetic Vision system (E/SV) is shown in FIG. 1. It consists of a block diagram of a forward looking sensor set 1, a display processor 2, and a pilot's display 3, with an aircraft sensor data set 4, including an air data computer, distance measuring equipment and an inertial reference system, which provides data to the other functional elements. The pilot 5 uses the display to fly the aircraft through actuation of the aircraft control system 6. These functional elements as represented by the block diagram may be distributed differently than shown. For instance, the processing of the display may be distributed between the forward looking sensor set 1 and the pilot's display 3 and the aircraft flight data sensor set 4, thus avoiding separate hardware for this function. This type of display apparatus and distribution technique is well known in the art. The forward looking sensor set consists of a millimeter wave radar, in the 35 or 95 Ghz range. Other equivalent equipment such as a Forward Looking Infrared (FLIR) system, or a radiometer in the 35 or 95 Ghz range, or any combination of these sensors may be used, in order to provide penetration in poor weather conditions. Elements in the forward looking sensor set in the range 35 and 95 Ghz are very short wave length sensor sets adapted for penetrating fog and rain while still permitting an adequately detailed display due to the short wavelength. The range for the short wavelength devices is very short for example two to three mile range indicates they are effectively utilized at 250 feet altitude or below. The forward looking sensor set is indexed to the longitude direction of the aircraft so that the information received from the forward looking sensor set as displayed on the wind screen by the Head Up Display appears to be what the pilot would actually see in good visibility conditions.

The Inertial Reference System (IRS), which is part of the aircraft flight data sensor set 4, used in this system are those which meet the ARINC characteristic 704-2 dated Aug. 30, 1980. At least two companies make such a unit, Honeywell and Litton. However, any combination of sensors which provides equivalent information will suffice.

Figure 8:
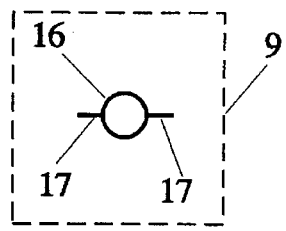
FIG. 8 is a symbolic diagram of the velocity vector.

The automatic landing mode is dependent on the presentation and position of the aircraft velocity vector 9 (the symbol for which is shown in FIG. 8) on the heads up display.

Figure 7:
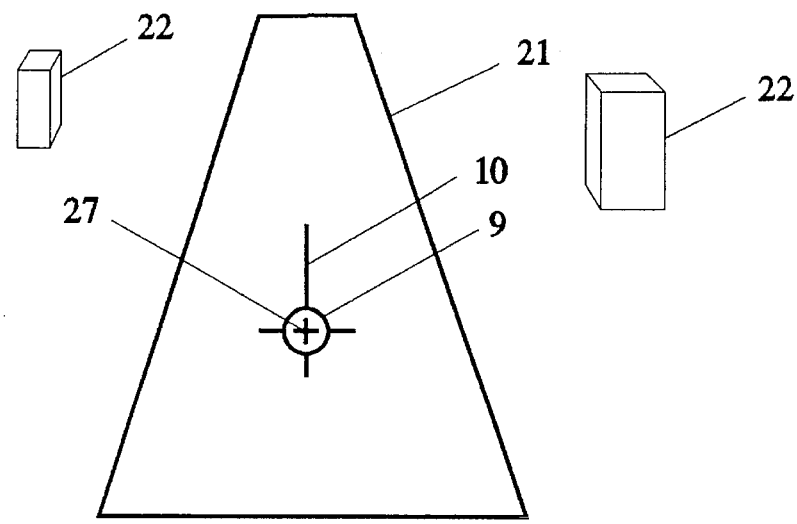
FIG. 7 is a runway view on the final track course.
Figure 10:
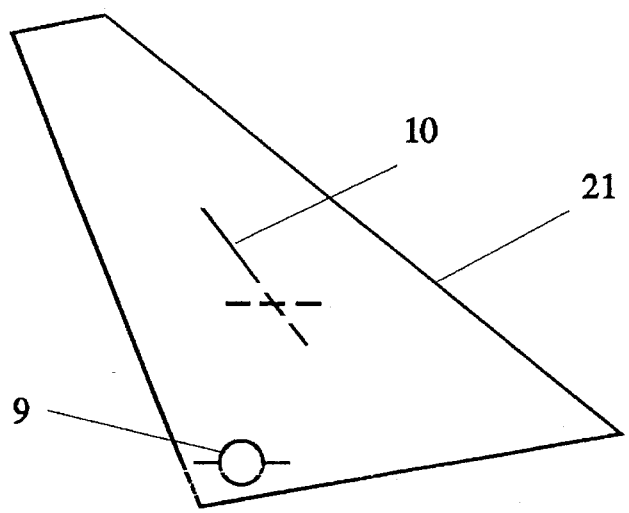
FIG. 10 is a runway view on approach showing cursor alignment.

The pilots display 3 presents the forward looking sensor set 1 data and may present other data such as airspeed, altitude, etc. on a head up or a head down display. The forward looking sensor set 3 data is best utilized through a head up display 9 as illustrated in FIGS. 7 and 10, so that the pilot 5 can see through this display with the sensor image appearing superimposed on the real world scene if the weather allows visible observations. If the weather does not allow sufficient visibility then the data supplied from the forward looking sensor presents the real world scene artificially to enable the pilot 5 to fly the aircraft.

Figure 2:
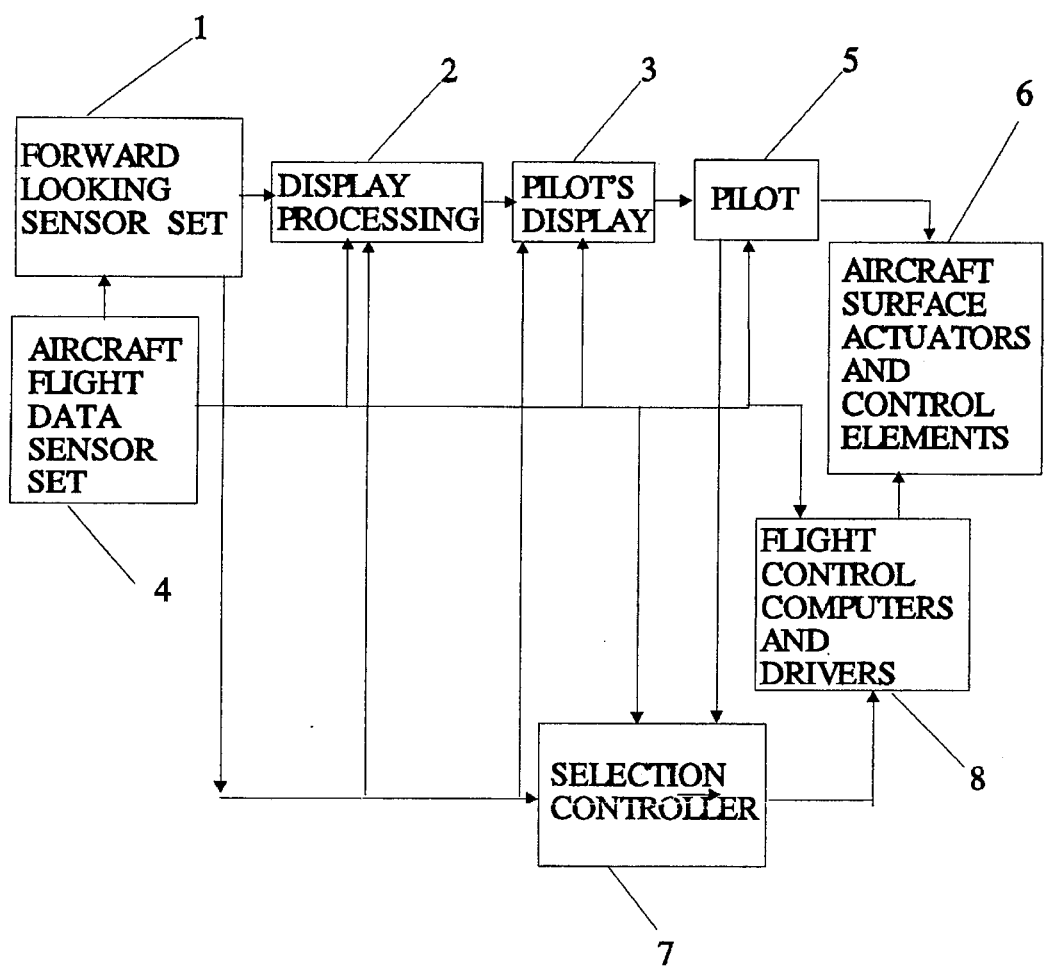
FIG. 2 is a block diagram of the Enhanced/Synthetic Vision system with automatic landing.
Figure 9:
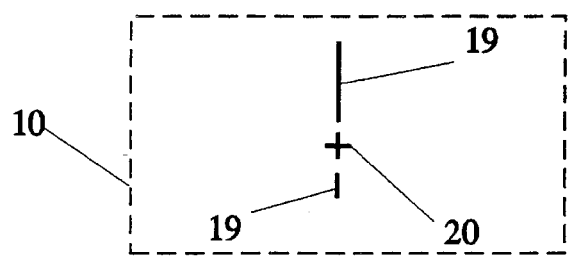
FIG. 9 is a symbolic diagram of the special cursor.

FIG. 2 shows the E/SV of FIG. 1 augmented with a pilot selection controller 7 and flight control computers 8 including the necessary drivers for actuation of the control surfaces which is required for automatic landing. The display produced by the E/SV includes the real world scene displayed as discussed above with respect to FIG. 1 but also includes the display of a special cursor 10 (the symbol for which is shown in FIG. 9. The position and angular disposition of this cursor 10 is controlled by the pilot 5 through the selection controller 7.

Figure 3:
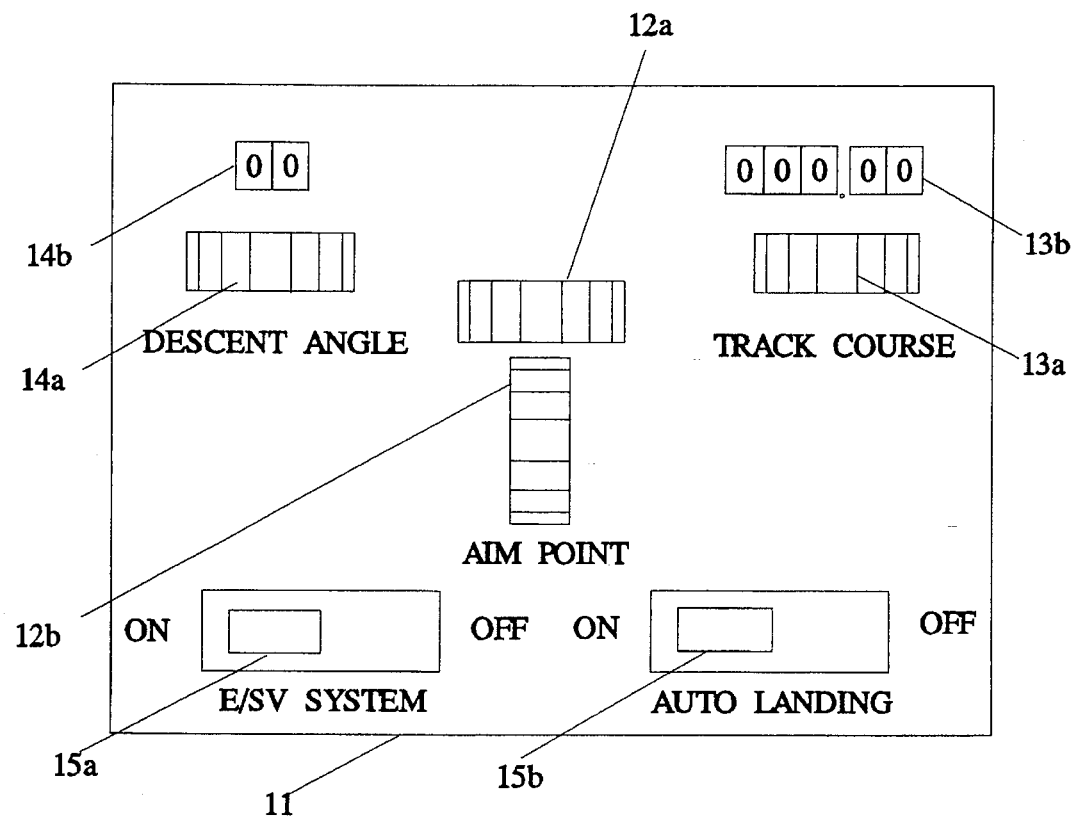
FIG. 3 is a top down view of the pilot's control panel.
Figure 4:
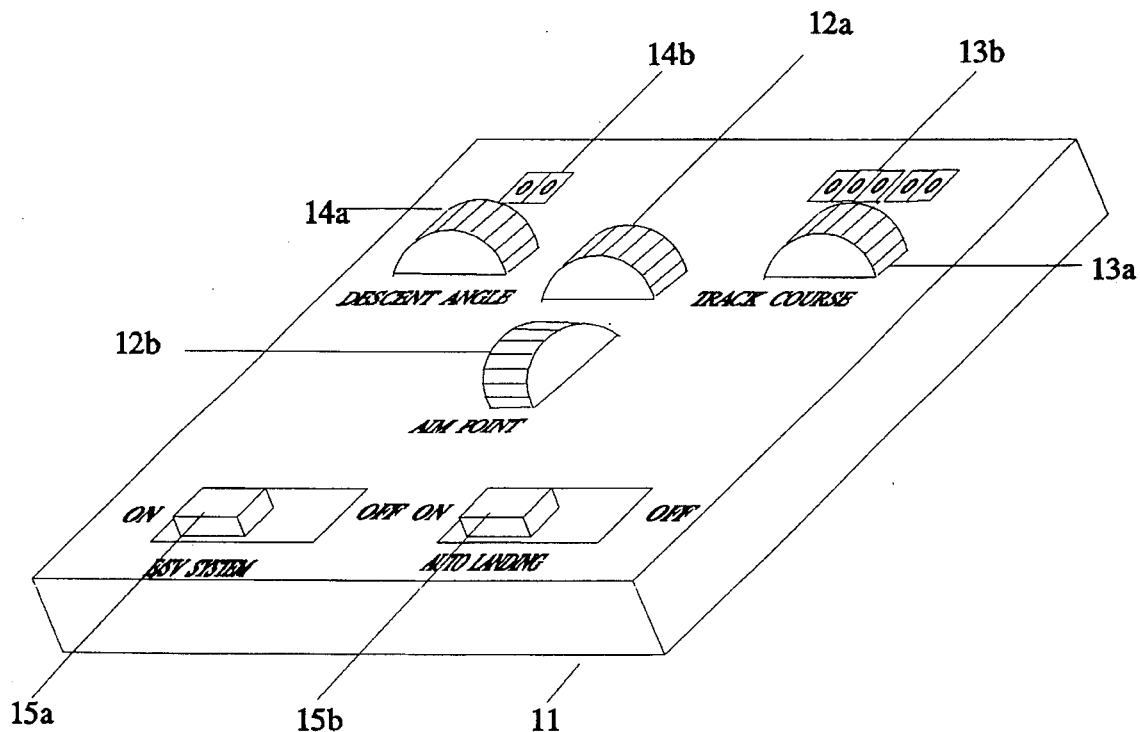
FIG. 4 is a perspective view of the pilot's control panel.

The automatic landing function is achieved by providing the pilot 5 with a control panel 11 as shown in FIGS. 3 & 4. Six controls are shown in FIG. 3 and FIG. 4 for the pilot 5 to operate; these include: a pair of thumbs wheels 12a and 12b, which control the horizontal and vertical position respectively of the cursor on the display (a joystick may be used in place of the thumbwheels provided is not automatically centering). A track course thumb wheel control 13a, which controls the angular disposition of the cursor, and a companion track course display 13b which provides a readout of the compass heading resulting from the track course setting are also provided. A descent angle thumb wheel control 14a, for input of the desired approach descent angle and an on/off switch 15a, for engaging and disengaging the E/SV, and an on/off switch 15b for engaging and disengaging the automatic landing system are also included on the control panel. While thumbwheels has been illustrated for both vertical and lateral control, a suitable joystick may be used for each and keyboard entry may be substituted for all or part of the entries on the control panel.

The interface to the selection controller 7 is through use of the control panel 11, mounted in the cockpit which is coupled electrically to the controller through the switches and the thumbwheels each of which operate a variable potentiometer or equivalent. Information may also be incorporated within a computerized navigation data base which stores the airport data and compares the airport data with the aircraft position at any time; or it may be a data link from either a navigation source, a ground based sensor installation different from ILS glideslope and localizer beams; or may be a combination of any of them and may be utilized as part of this input to the system. The selection controller 7 has an output which provides information to the pilot 5 through his display and an output which also provides data to the flight control computers 8.

Figure 5:
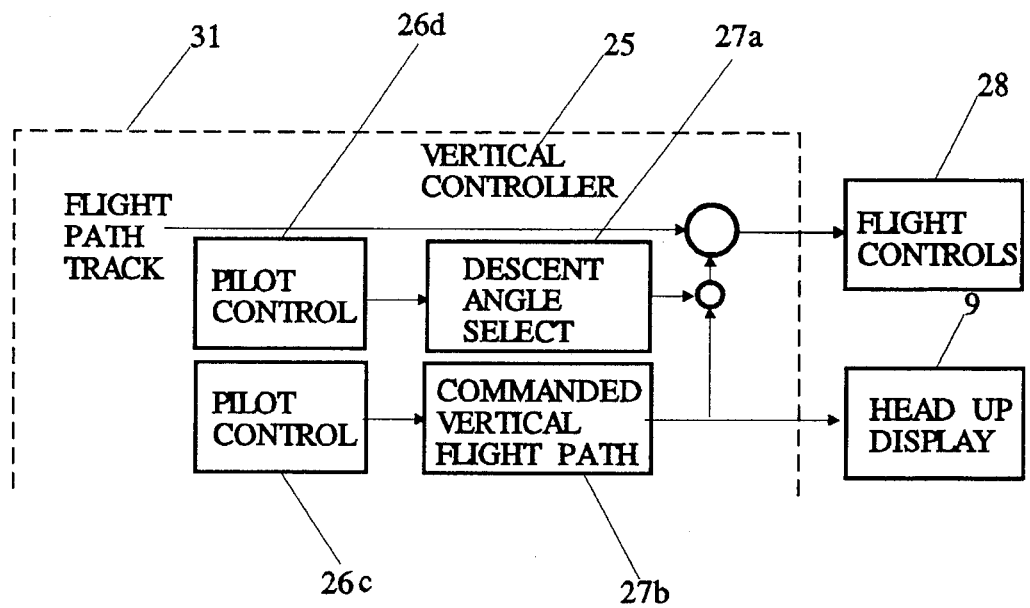
FIG. 5 is a block diagram of the vertical segment of the controller.
Figure 6:
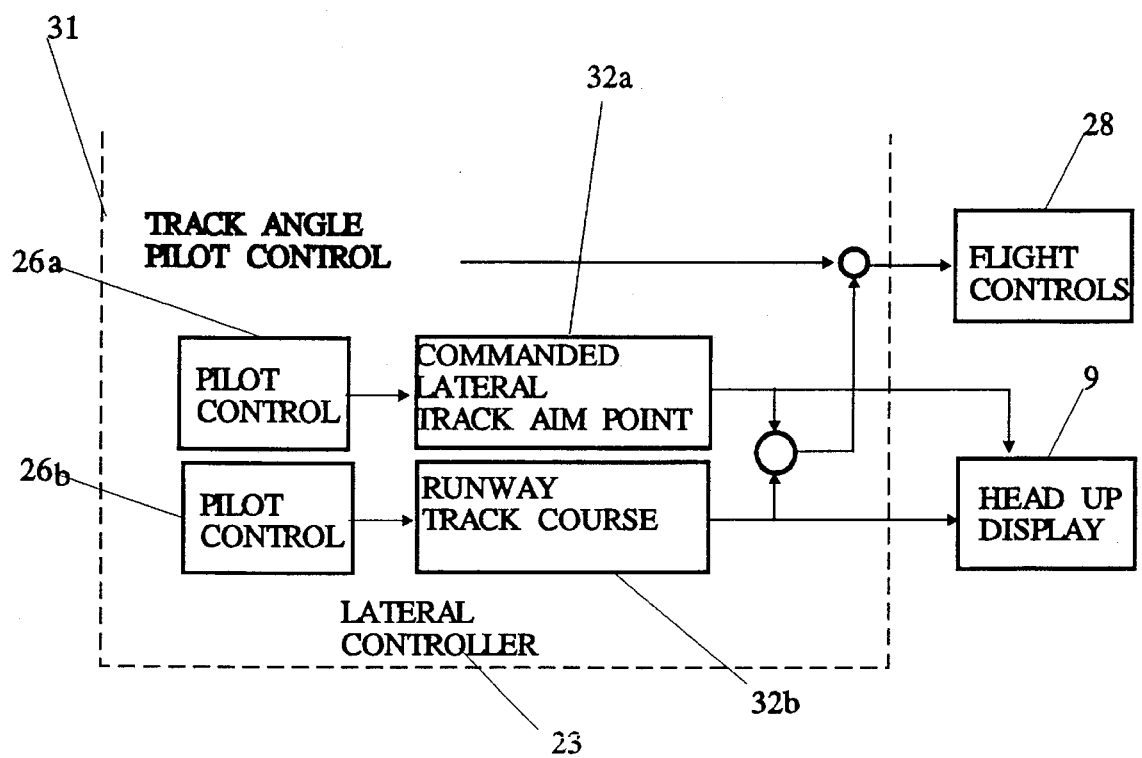
FIG. 6 is a block diagram of the lateral segment of the controller.

The selection controller 7 which generates the equivalent of ILS glideslope and localizer beam angular error signals based on a designated inertial flight path that the aircraft is to follow is shown in a block diagram in FIGS. 5 and 6. The controller 7, then uses this inertial flight path to develop guidance errors which are used to drive the flight control computers 8.

The flight control computers 8 use these errors in accordance with the control laws that currently govern automatic approach and landing and includes normal flare and align or decrab maneuvers to complete the landing to touchdown. The aircraft may also be guided by the system during rollout along the runway.

The design of the selection controller as shown in FIGS. 5 and 6 has two basic sections. These are a vertical control section 25 and a lateral control section 23 as shown in FIGS. 5 and 6. The design of the controller for pitch or vertical control is shown in FIG. 5. In FIG. 5 the pilots selection control 26c allows the pilot 5 to select the vertical position of the cursor 10 to coincide with the aim point 27 through the pilot 5 selection control 26c. This corresponds to the manipulation of the vertical thumb wheel 12b of FIG. 4. Setting the vertical cursor position establishes the vertical location of the aim point and permits the calculation of an angular error based on deviation of the velocity vector which represents the then current flight path from the flight path required to reach the aim point 27. The setting is also coupled to the Head Up Display 9 to establish the cursor position on the display.

In addition, the controller has a descent angle selection control 26d which corresponds to the Descent Angle Control knob 14a of FIG. 3, to enable the pilot 5 to preselect the glidepath for the particular type of aircraft (usually 3 deg.). Setting the descent angle selection sets a decent path and permits the calculation of an angular error based on deviation from the descent path.

These errors are summed with the then current flight path track and applied to the flight controls 28 through the flight control computer 8 as in a typical ILS system.

The design of the controller for lateral control is shown in FIG. 6. In FIG. 6 the pilot's selection control 26a allows the pilot 5 to select the lateral position of the cursor 10 to the perceived aim point 27 through the pilot control panel 11. This corresponds to the adjustment of the horizonal position of the cursor through manipulation of the thumb wheel 12a of FIG. 4 although a separate control knob or keyboard could be used. Setting the lateral cursor position establishes the lateral position of the aim point and permits the calculation of an angular error based on lateral deviation of the flight path from the aim point as in the vertical section described above. The setting is also coupled to the Head Up Display 9 to establish the cursor's lateral position on the display.

In addition, the controller has a commanded track course control 26b which corresponds to the Track Course Control knob 13a of FIG. 3, to enable the pilot 5 to select the track course of the runway center line. Setting the track course allows the calculation of an angular track course error based on the angle deviation of the cursor centerline 19 from the vertical.

The pilot 5 can modify the inertial flight path with his cockpit control panel 11 at any time during the approach, landing and rollout. These adjustments are based on the visual scene presented by the forward looking sensor set 1 and the symbology currently used to represent the aircraft velocity vector 9 and the special cursor 10, as the aircraft progresses through the approach, landing and rollout.

The velocity vector symbol 9 shown in FIG. 8, is of the form currently used in headup displays and comprises a circle 16 having two parallel lines 17 on either side thereof. These lines 17 represent the wings of the aircraft and thus the roll position of the aircraft. Current systems compute the position and orientation of the velocity vector 9 for display to establish the direction of the velocity of the aircraft and its roll position.

The special cursor 10 is designed to include horizontal line 20 which is aligned with the horizon and a broken vertical line 19 which is initially vertically disposed on the display but is adjustable to angles greater than or less than 90 degrees as will be discussed below. The lines form a cross 20 in the lower portion of the cursor which is to be used in a manner similar to the cross-hairs of a targeting scope. Line 19 is elongated having a greater portion above the cross than below so as to provide a better visual cue for setting the track course.

While the symbols have certain functional characteristics, the specific shape or pictorialization of these symbols may take on various forms. Such symbols need not be the form as shown, and other symbologies and graphics may be more compatible to the particular display that is being used and are considered within the scope of this invention. The content, the meaning, locations and operations of the symbol is to provide the pilot 5 with the ability to place the equivalent of glideslope and localizer error signals into the system, thus providing an automatic tracking and landing capability within the aircraft.

FIG. 7 illustrates the ideal forward looking scene as observed by the pilot 5 and shows the runway 21 and other objects 22 around the airport as seen by the forward looking sensor set 1. In this example the pilot 5 has positioned the cursor 10 over the aim point 27 on the runway. The flight control computer has caused the aircraft to fly to the aim point 27 and the display shows the velocity vector superimposed on the cursor 10 which is on the aim point 27. The elongated portion 19 of the cursor is aligned with the center line of the runway 21 and automatic landing will take the aircraft to the flare point. No error information will be generated for the pitch axis flight computer once the flare sequence is entered. The lateral control will, however, continue to provide errors for guidance throughout the landing and rollout.

FIG. 10 illustrates a typical view of the forward looking scene as observed by the pilot 5 after reaching radar range and shows an oblique approach to the runway 21 after setting the cursor 10 to the aim point on the runway. In this case not only is the aircraft off the runway 21 centerline track and aim point which develops the errors to return the velocity vector 9 to the superimposed position on the runway 21 aim point 27 but additional angular errors must be generated to permit the aircraft to become aligned with the runway centerline. In this case the pilot 5 has positioned the cursor 10 cross-hairs 20 over the aim point 27 and has aligned the elongated portion 19 of the cursor 10 with the estimated center line of the runway 21. The pilot's control panel readout 13b will show the actual compass heading of the runway center line and an angular error is derived from the difference in aircraft course and the runway heading.

Accordingly, the pilot 5 through the thumb wheel controls 12a and 12b selects the inertial flight path intersection with the ground and through thumb wheel 13a the track course along the runway 21. The presentation of these data, the aim point 27 and track course, relative to the velocity vector 9 permits the calculation of angular guidance errors from the differences in such position which the automatic landing system can use in a manner similar to those generated by ILS ground based systems.

Figure 11:
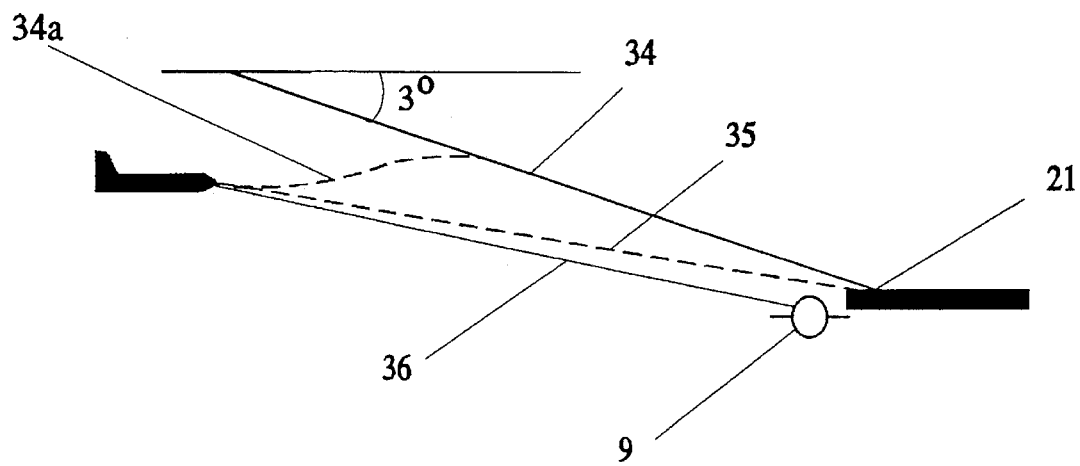
FIG. 11 is a side view of the runway approach showing vertical elements.

FIG. 11 shows a side view of the approach. A desired decent track 34 is shown to the runway 21 at 3 degrees from the horizon. (all angles are exaggerated for purposes of illustration). A line of sight 35 to the aim point 23 is shown which is less than 3 degrees from the horizon along with the then present velocity vector 9 and the vertical velocity segment 36 which is also less than 3 degrees from the horizon and in this case less than the angle of line of sight. In this view the aircraft is below the desired 3 degree descent track course and would correct upwards along path 34a in order to intercept the desired descent angle path 34.

Figure 12:
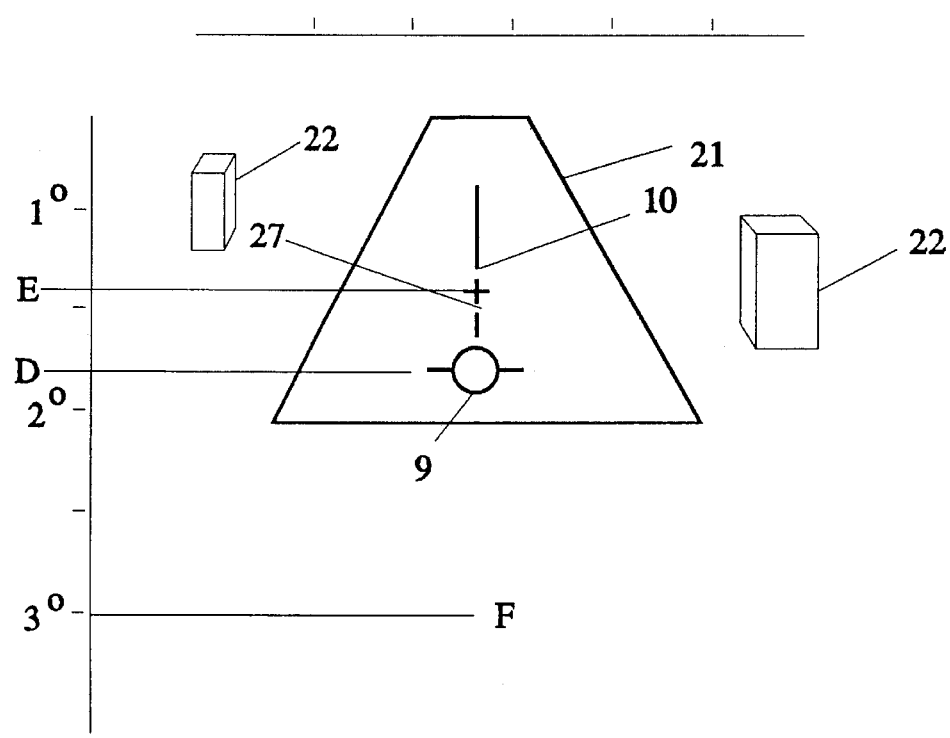
FIG. 12 is a display view of the events depicted in FIG. 11.

FIG. 12 shows the display of the events in FIG. 11 as seen by the pilot 5. The velocity vector is aligned laterally with the aim point 27 but below the aim point 27. Therefore the aircraft is not on course to the runway 21 aim point 27 and vertical errors will be generated.

In order to determine a path, 34a, which would intersect the 3 degree desired descent angle to the aim point on the runway 21, the computer computes an angular error factor determined by the amount the aim point deviates from the Decent Angle selected (E-F). In this case 3 degrees. In addition, and additional vertical error factor represented by the deviation of the velocity vector from the Decent angle selected (E-D) is required in order to fly to the aim point on a 3 degree decent. These error factors will be summed and in this particular case will result in a climb of the aircraft in order to fly to the 3 degree decent point. FIG. 12 illustrates the view scene on the HUD with angular deviation from the horizon information on the left. A decent angle error is determined by the difference in angular value between the 3 degree point and angle represented by the cursor 10 position for a descent angle error. A vertical track course error is determined by the difference in angular value between the velocity vector 9 and the cursor 10. These two errors are summed and applied as a vertical angular ILS error to the vertical flight computer. For the purpose of this disclosure the differences which occur above the cursor 10 are positive errors and differences which occur below the cursor 10 are negative errors such that in the event the cursor is below the 3 degree point and above the velocity vector the actual error will be a difference between the descent angle error and the vertical track course error. The reverse could be true, however, dependent on the manner in which the flight computer accepts the angular error data. The magnitude of these error factors may be adjusted upwards or downwards as necessary dependent upon the type of aircraft and the severity of the correction path 34a to the desired flight path 34 which may either be an asymptotic approach or damped oscillations about the desired flight path.

Figure 13:
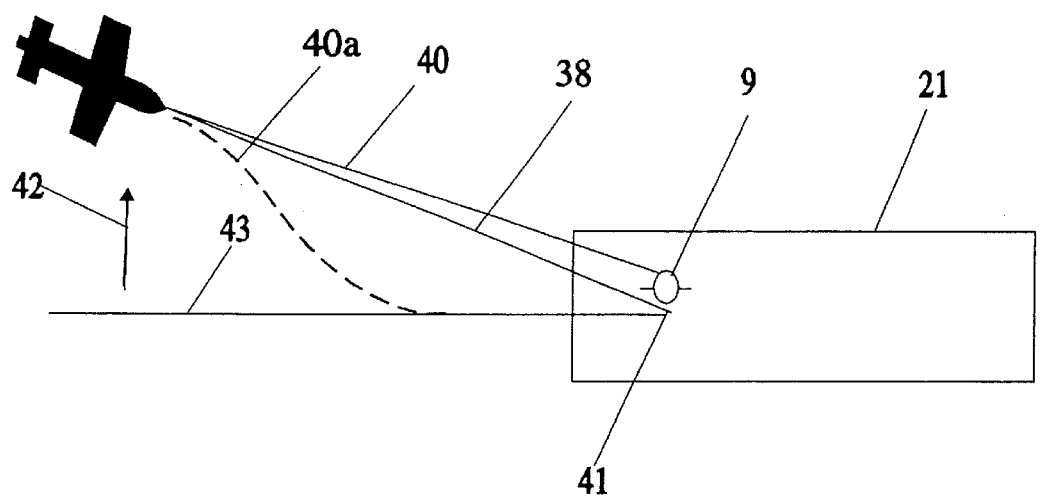
FIG. 13 is a top down view of the runway approach showing lateral elements.

FIG. 13 shows a top down view of the approach. A desired flight path track 40a is shown to the runway 21 centerline 43. The then present track 40 of the velocity vector 9 and a course heading 41 and a wind vector 42 are also shown along with the runway 21 centerline.

Figure 14:
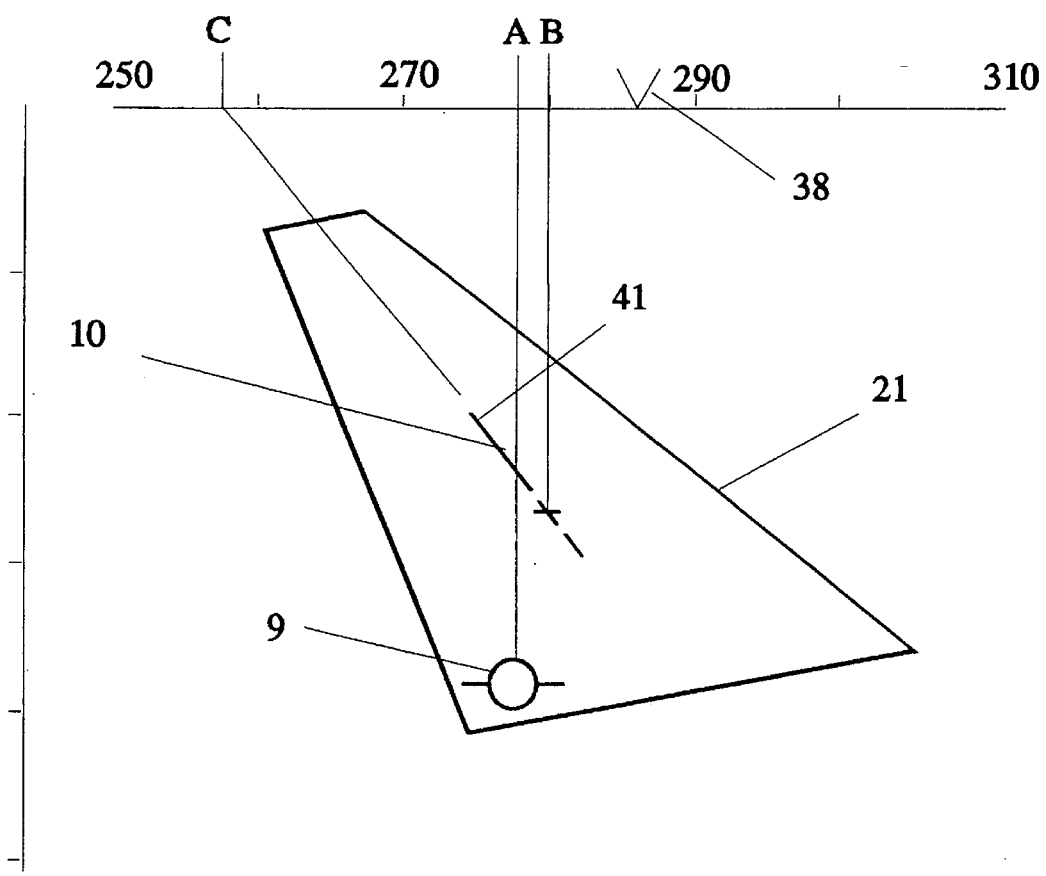
FIG. 14 is a display view of the events depicted in FIG. 13.

FIG. 14 shows the display of the events in FIG. 13 as seen by the pilot 5. The elongated portion 19 of the cursor 10 is aligned with the center line of the runway 21.

Computing the lateral difference between the velocity vector 9 and the cursor 10 alone is not sufficient to determine the path 40a which will bring the aircraft into alignment with the centerline of the runway when the approach is not along such centerline.

The lateral deviation of the velocity vector 9 from the cursor 10 is determined by the angular difference between them (B-A) to determine the angular lateral aim point error. Using the elongated portion of the cursor, an angular lateral track course error factor is also determined by computing the angular difference between the heading of the runway center line 41 and the cursor 10 (B-C). The two resultant error factors are summed as a total lateral error factor and applied to the flight computer. For the purpose of this disclosure the differences which occur to the right of the cursor 10 are positive errors and differences which occur to the left of the cursor 10 are negative errors.

The pilot need only make minor adjustments in the track course as the flight progresses. In the alternative the flight computer can be programmed to calculate a new cursor orientation by determining the change in aircraft course relative to a stored magnetic heading of the runway centerline.

The approach to the airport begins with the aircraft making a final turn in the direction of the airport and subsequently starting a descent, usually 3 deg. At some point in the approach the ground will come into range of the sensor and the E/SV will begin to display a ground segment on the forward looking display. The pilot 5 makes his selection of the glidepath angle and the desired track course of the runway 21. As the aircraft descends the runway 21 and the surrounding buildings 22 will come into view in the scene. The pilot 5 then sets the aim point 27 for pitch and lateral control. He then presses the engage button (on switch 15a) and monitors the progress of the approach. When the pilot engages the automatic landing feature of the instant invention (on switch 15b), the cursor appears initially superimposed upon the velocity vector and in a vertical orientation.

To avoid any unexpected or unanticipated changes in flight path which the auto pilot might take as a result of the differences between the cursor the velocity vector positions the system first determines whether or not the E/SV is on, if it is not on then it cycles through and retests whether or not the E/SV is on. If the E/SV is on the computer sets the initial cursor position, which is superimposed on the velocity vector, and sets the initial cursor angle to 90 degrees. This information is then sent to the display computer. The forward looking sensor data is also sent to the display computer. The system then tests to determine whether the automatic land feature has been switched on. If it has not been, then the forward sensor data continues to be sent to the display computer. If it has been switched on then the cursor position and angle data is sent to the display processor. The computer then reads the vertical and lateral cursor control positions as set by the thumb wheels. If the position has changed, the new position information is sent to the display processor. The computer system then reads the track course angle as set by the thumb wheels. If the track course angle has changed, a new cursor angle is computed and sent to the display processor. If not then the information on the new variables in the system is stored. If the angle has not been changed then the current variable information is stored, this would include the cursor lateral position, the cursor vertical position, the track course angle, the descent angle, the computed cursor angle, the velocity vector lateral position and the velocity vector vertical position. The computer then computes the difference between the velocity vector and the cursor lateral and vertical positions to determine a lateral angle error and then the computer computes a track course error based on the angle of the cursor. The lateral angle error and the track course angle error are then summed to determine a total lateral error angle. Error is then applied to the on-board automatic landing system computer as a lateral track error as would be derived from an ILS system.

Aim point adjustments can be made at any time to update the commands as the scene enlarges and more detail is seen. The course adjustment can also be made if it does not coincide with the centerline of the runway 21. The align (or decrab) flare, nose lowering and runway 21 rollout segments of the automatic landing would progress without the need for the pilot 5 to operate the flight controls.

Figure 15A:
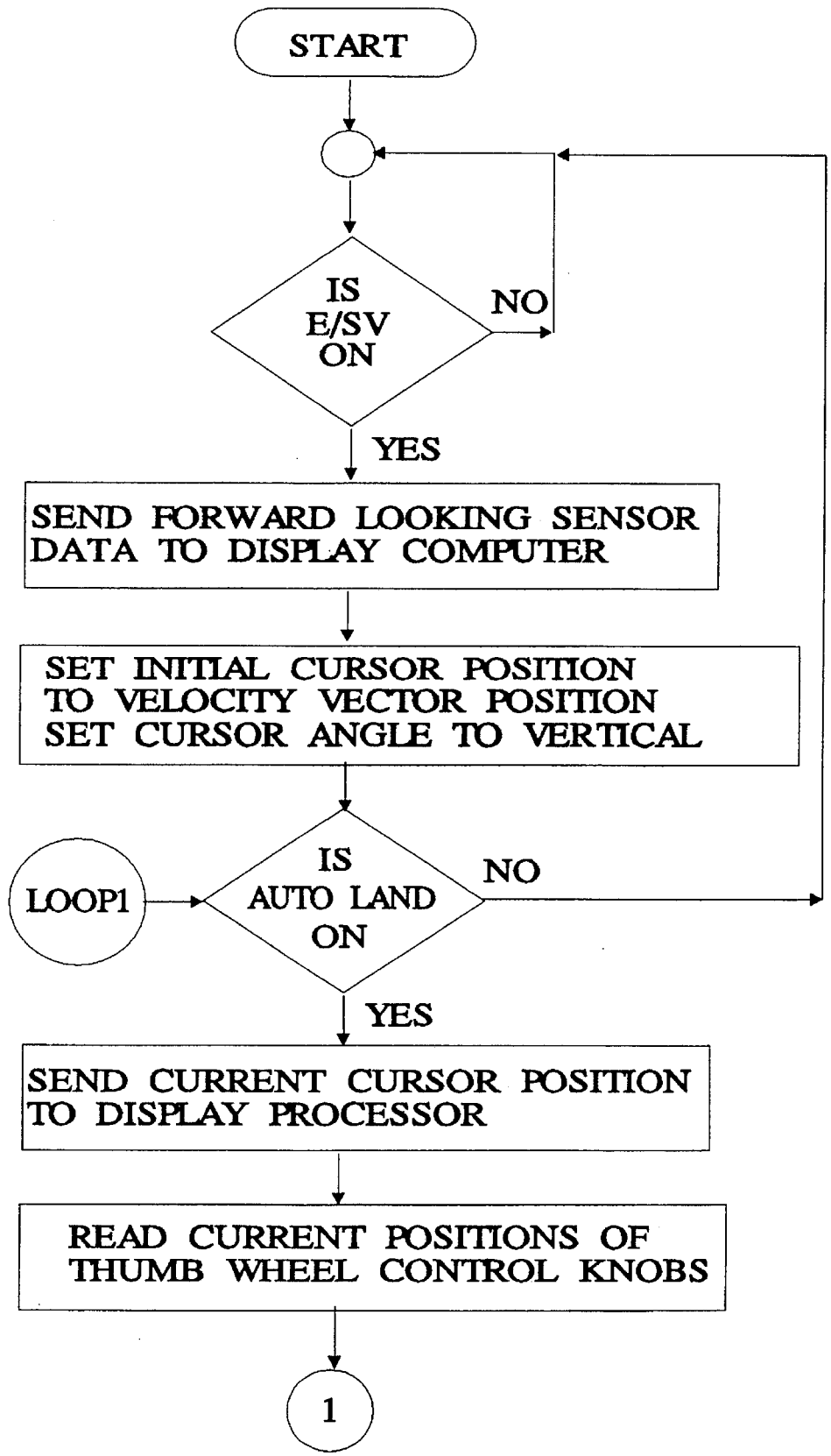
FIG. 15 is a flow diagram of the system operation.
Figure 15B:
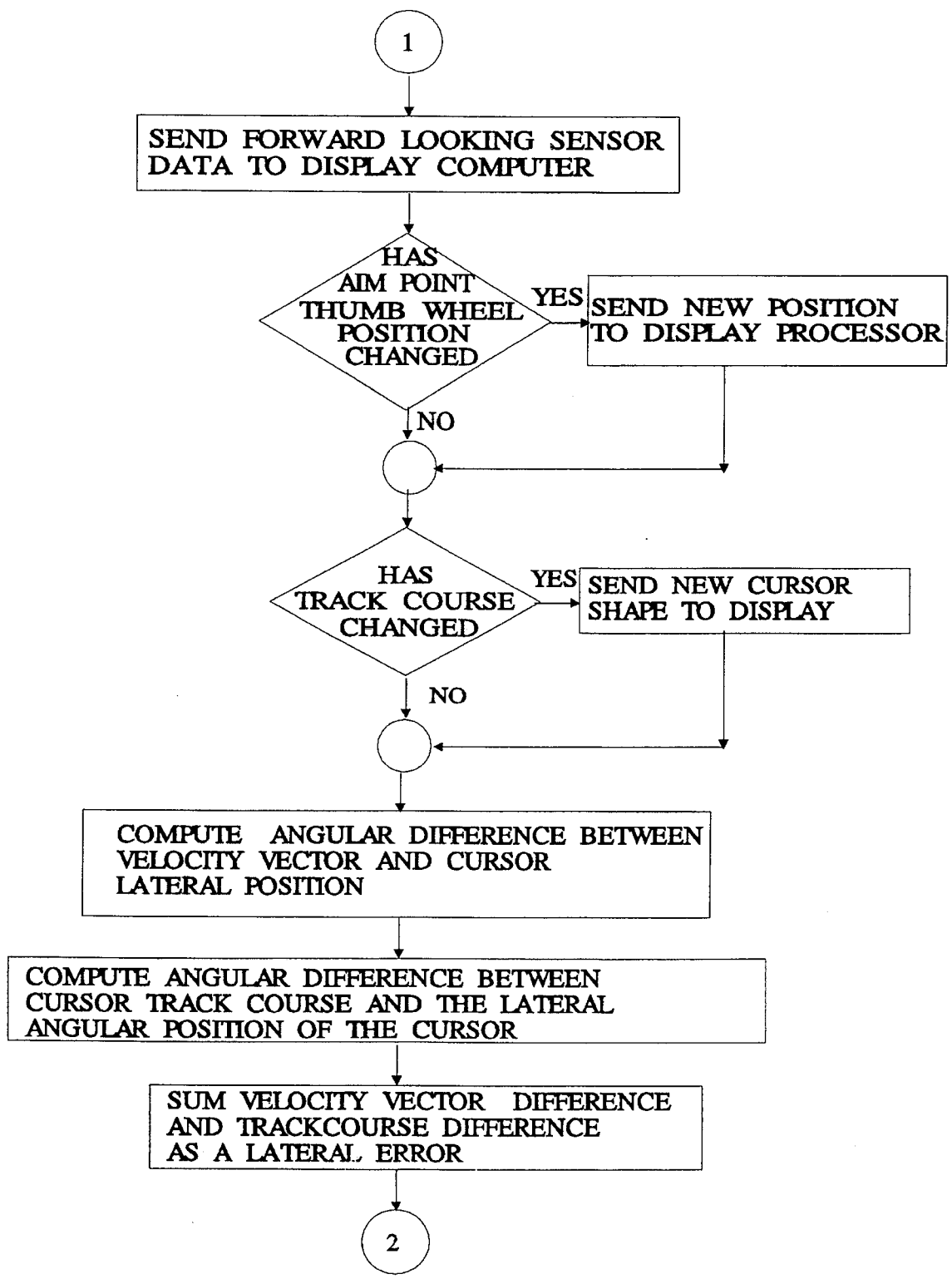
Figure 15C:
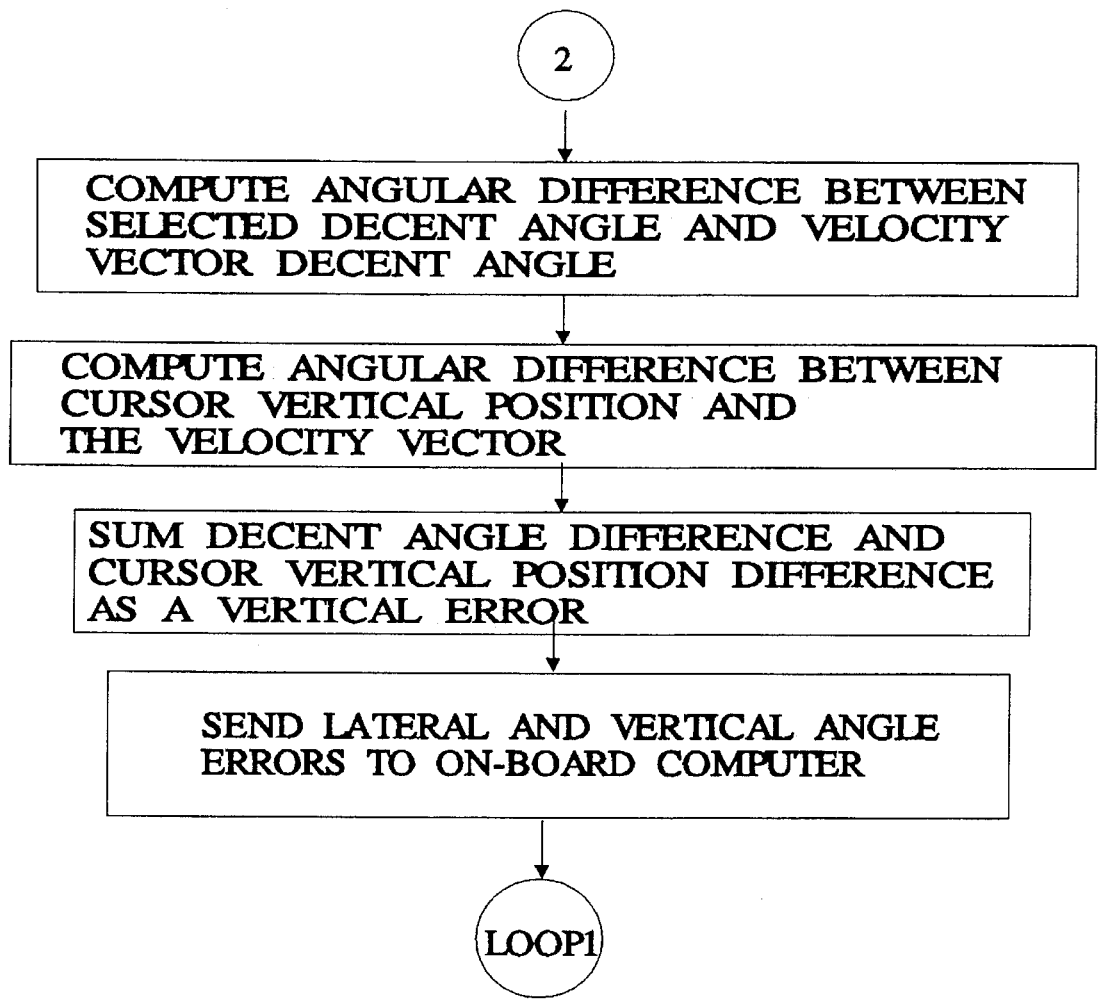

A flow diagram is presented in FIG. 15a, 15b, and 15c which illustrates the processing of the input data and the manipulation thereof and the application to the flight controls as discussed herein.

In the case of an Instrument Landing System (ILS) runway, the on-board instrumentation includes a flight director system which directs the aircraft to a position where it can intercept the localizer and glide slope beams which emanate from the ground. Once these beams are intercepted, the on-board flight computers generate appropriate error signals which are used to perform the necessary left and right (lateral) and up and down (vertical) maneuvers to follow the beams to the runway. These ILS errors are computed as angle errors representing the angular deviation from an imaginary line located halfway between the central axes of each of the ILS beams. This position is a null position or zero angle deviation position and then indicates the desired flight path. A runway symbol is generated and displayed on a CRT or other viewing device to simulate the view of the actual runway during ILS approach.

The implementation of this invention requires that the aircraft already has the capability to make an ILS automatic Landing. The E/SV automatic landing system utilizes the automatic landing feature with the on-board derived guidance signals as described herein and can provide visibility in weather impaired situations. It is applicable in any case including carrier landings, or other autonomous landing systems where there are no ground aids.

While the description of this invention has dealt with adverse weather conditions and landings when there is little or no visibility, it should be noted that the automatic landing feature of the instant invention can be utilized in clear visibility conditions as well in which case the display of the forward looking sensors need not be displayed and actual runway views utilized by the pilot 5.

Having thus described the invention what is claimed is:

1. An aircraft automatic landing system capable of utilizing ground based ILS input signals input to said landing system adapted for use without ground based ILS signals, comprising:
   a. a computer,
   b. a display device coupled to said computer,
   c. a vector cursor generated by said computer for displaying aircraft vector information on said display device,
   d. an on-board forward looking sensor set coupled to said computer for detecting environmental information forward of said aircraft having an output for transmitting the information received from the sensor set to the computer for display on the display device,
   f. at least one reference cursor, selectively movable with respect to said display, displayed on said display,
   g. a cursor control for selecting the position of said reference cursor on the display,
   h. a computing unit for computing the difference in position between the vector cursor and the reference cursor and generating difference information,
   i. a converter for converting the difference information into a signal suitable for input to the automatic landing system, and
   j. an interface for applying said signal to the input of the automatic landing system.

2. An aircraft automatic landing system as set forth in claim 1, wherein the computing unit; the converter and the interface, are included on a controller which includes:
   a. a computing apparatus adapted for computing the difference in position between said reference cursor and vector cursor,
   b. a converter for converting the difference in position to a signal, and
   c. a port to the automatic landing system coupled to said converter for receiving and applying said ILS signal the ILS input of the automatic landing system.

3. An automatic landing system as set forth in claim 2 wherein said computing unit and said converter include instructions applied to said controller for performing the following steps:
   a. computing the difference in lateral and vertical position between the vector cursor and the reference cursor,
   b. generating at least one lateral position signal based on the lateral difference,
   c. inputing said lateral position signal to the input of the automatic landing system,
   d. generating at least one vertical position signal based on the vertical difference, and
   e. inputing said vertical position signal to at least one input of the automatic landing system.

4. An automatic landing system as set forth in claim 2 wherein said computing unit and said converting unit include instructions applied to said computing unit for performing the following steps:
   a. computing the relative difference in lateral and vertical position between the vector cursor and the reference cursor on the display device,
   b. generating at least one lateral position error from the lateral difference,
   c. inputing said lateral position error to at least one input of the on-board automatic landing system,
   d. generating at least one vertical position error from the vertical difference, and
   e. input of said vertical position error to at least one input of the on-board automatic landing system.

5. An automatic landing system as set forth in claim 1 wherein the cursor control comprises:
   a. at least one control mechanism for adjustment of the lateral position of the reference cursor,
   b. at least one control mechanism for adjustment of the vertical position of the reference cursor, and
   c. at least one control mechanism for adjustment of the shape of the reference cursor for the alignment thereof along a centerline.

6. An automatic landing system as set forth in claim 1 further comprising a reference cursor which comprises:
   a. an elongated central axis which may be selectively adjusted to any angular position relative to the vertical,
   b. a horizontal portion which is parallel with the horizon, and
   c. a central portion having cross-hair which may be selectively centered on any point on the display.

7. An aircraft automatic landing system capable of utilizing ground based ILS input signals adapted for use without ground based ILS signals comprising:
   a. a computer,
   b. a display device coupled to said computer,
   c. a vector cursor generated by said computer for displaying aircraft vector information on said display device,
   d. an on-board forward looking sensor set coupled to said computer for detecting environmental information forward of said aircraft having an output for transmitting the information received from the sensor set to the computer for display on the display device, f. at least one reference cursor, selectively movable with respect to said display, displayed on said display, g. a cursor control for selecting the position of a reference cursor on the display, h. means for computing the difference in position between the vector cursor and the reference cursor and generating difference information, and i. means for converting the difference information into a signal suitable for input to the automatic landing system, said means having an output adapted for applying the error signals to the input of the automatic landing system.

8. An aircraft automatic landing system as set forth in claim 7, wherein the means for computing the difference in position between the vector cursor and the reference cursor, is a controller which includes a. a computing apparatus adapted for computing the difference between said reference cursor and vector cursor, and b. an interface to the automatic landing system computer coupled to said controller.

9. An automatic landing system as set forth in claim 8 wherein said means for computing and said means for converting further comprise computer instructions applied to said computing apparatus for performing the following:

a. computing the difference in lateral and vertical position between the vector cursor and the reference cursor, b. generating at least one lateral position error from the lateral difference, c. inputing said lateral position error to at least one input of the automatic landing system, d. generating at least one vertical position error from the vertical difference, e. converting said position errors into ILS error information, and f. input of said vertical position error to at least one input of the automatic landing system.

10. An automatic landing system as set forth in claim 8 wherein said means for computing and said means for converting further comprises instructions applied to said computing unit for:

a. computing the difference in lateral and vertical position between the vector cursor and the reference cursor, b. generating at least one lateral position error from the lateral difference, c. inputing said lateral position error to at least one input of the on-board automatic landing system, d. generating at least one vertical position error from the vertical difference, e. converting the position errors into ILS information, and f. inputing of said ILS information to at least one input of the on-board automatic landing system.

11. An automatic landing system as set forth in claim 7 wherein the reference cursor control comprises:

a. a control mechanism for adjustment of the lateral position of the reference cursor, b. a control mechanism for adjustment of the vertical position of the reference cursor, and c. a control mechanism for adjustment of the shape of the reference cursor.

12. An automatic landing system as set forth in claim 7 wherein the reference cursor control further comprises:

a. a first thumb wheel which operates the lateral position control mechanism, b. a second thumb wheel which operates the vertical position control mechanism, and c. a rotatable knob for operation of the reference cursor centerline adjustment control mechanism.

13. An automatic landing system as set forth in claim 7 wherein said reference cursor further comprises:

a. an elongated central axis which may be selectively aligned along a runway centerline, b. a horizontal portion which remains parallel with the horizon, and c. a central portion having cross-hair for centering of said reference cursor on a desired point on said display.

14. An aircraft automatic landing system capable of utilizing ground based ILS input signals adapted for use without ground based ILS signals, comprising a. a computer b. a display device coupled to said computer c. a vector cursor generated by said computer for displaying aircraft vector information on said display device, d. an on-board forward looking sensor set coupled to said computer for detecting environmental information forward of said aircraft, having an output for transmitting the information received from the sensor set to the computer for display on the display device, f. at least one reference cursor, selectively movable with respect to said display, displayed on said display, g. a cursor control for setting the position of a reference cursor on the display which comprises: at least one control mechanism for adjustment of the lateral position of the reference cursor, at least one control mechanism for adjustment of the vertical position of the reference cursor, and at least one control mechanism for adjustment of the shape of the reference cursor for alignment along a line, and h. a computer coupled to said display and said automatic landing system programmed to:

i. compute the difference in lateral and vertical position between the vector cursor and the reference cursor, ii. generate at least one lateral position error from the lateral difference, iii. input said lateral position error to at least one input of the on-board automatic landing system, iv. generate at least one vertical position error from the vertical difference, and v. input of said vertical position error to at least one input of the on-board automatic landing system.

15. An aircraft automatic landing system as set forth in claim 14, wherein the computer, is a controller which includes a. a computing apparatus adapted for computing the difference between said reference cursor and vector cursor information, and b. an interface coupling said computing apparatus to the automatic landing system computer.

16. An automatic landing system as set forth in claim 14 wherein the reference cursor control comprises:

a. a joystick coupled to the computer.

17. An automatic landing system as set forth in claim 14 wherein said reference cursor further comprises:

a. an elongated central axis which may be aligned along a runway centerline, b. a horizontal portion which is parallel with the horizon, and c. a central portion having cross-hair which may be centered on an aim point.

18. An aircraft automatic landing system capable of utilizing ground based ILS input signals adapted for use without ground based ILS signals comprising a. an on-board computer
  b. a display device coupled to said computer,
  c. a vector cursor generated by said computer for displaying aircraft vector information on said display device,
  d. an on-board forward looking sensor set coupled to said computer for detecting environmental information forward of said aircraft, having an output for transmitting the information received by the sensor set to the computer for display on the display device,
  f. at least one reference cursor, selectively movable with respect to said display, displayed on said display,
  g. a cursor control for selecting the position of a reference cursor on the display,
  h. means for computing the difference in position between the vector cursor and the reference cursor and generating difference information,
  i. means for converting the difference information into an ILS error signal suitable for input to the automatic landing system computer, and
  j. an output coupled to said converting means for applying the error signals to the ILS input of the automatic landing system.

19. An aircraft automatic landing system as set forth in claim 18, wherein the means for computing the difference in position between the vector cursor and the reference cursor, is a controller which further comprises:

a. a computing unit adapted for computing the difference between said reference cursor position and the vector cursor position, and
  b. an interface to the automatic landing system computer for coupling said differences to said automatic landing system.

20. An automatic landing system as set forth in claim 19 wherein said means for computing and said means for converting comprise computer instructions applied to said computing unit for performing the following:

a. computing the difference in lateral and vertical position between the vector cursor and the reference cursor,
  b. generating at least one lateral position error from the lateral difference,
  c. inputing said lateral position error to at least one input of the on-board automatic landing system,
  d. generating at least one vertical position error from the vertical difference, and
  e. input of said vertical position error to the input of the on-board automatic landing system.

21. An automatic landing system as set forth in claim 19 wherein said means for computing and said means for converting comprise computer instructions applied to said computing unit for performing the following:

a. computing the difference in lateral and vertical position between the vector cursor and the reference cursor,
  b. generating at least one lateral position error from the lateral difference,
  c. inputing said lateral position error to at least one input of the on-board automatic landing system,
  d. generating at least one vertical position error from the vertical difference, and
  e. inputing of said vertical position error to at least one input of the on-board automatic landing system.

22. An automatic landing system as set forth in claim 18 wherein the reference cursor control comprises:

a. at least one control mechanism for adjustment of the lateral position of the reference cursor,
  b. at least one control mechanism for adjustment of the vertical position of the reference cursor, and
  c. at least one control mechanism for adjustment of the shape of the reference cursor for alignment along a selected reference cursor centerline.

23. An automatic landing system as set forth in claim 18 wherein the reference cursor control further comprises:

a. a single joy stick which operates the lateral and vertical position control mechanism, and
  b. a knob for rotational operation of the centerline adjustment control mechanism.

24. An automatic landing system as set forth in claim 18 wherein the controller further comprises:

a selection switch adapted for setting the glidepath angle during approach for coupling an angular glidepath error signal to said automatic landing computer.

* * * * *